(12) United States Patent
Zhao et al.

(10) Patent No.: US 9,948,649 B1
(45) Date of Patent: Apr. 17, 2018

(54) INTERNET ADDRESS FILTERING BASED ON A LOCAL DATABASE

(71) Applicant: Juniper Networks, Inc., Sunnyvale, CA (US)

(72) Inventors: Ye Zhao, Beijing (CN); Jun Yang, Beijing (CN); Tao Zhao, Beijing (CN); Lin Chen, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 166 days.

(21) Appl. No.: 14/586,037

(22) Filed: Dec. 30, 2014

(51) Int. Cl.
*H04L 29/06* (2006.01)
*G06F 21/62* (2013.01)

(52) U.S. Cl.
CPC .............. *H04L 63/10* (2013.01); *G06F 21/62* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,886,043 B1 * | 2/2011 | Chan | H04L 29/12066 370/338 |
| 8,032,923 B1 * | 10/2011 | Li | G06F 17/30867 370/229 |
| 8,443,452 B2 | 5/2013 | Koulinitch et al. | |
| 8,813,232 B2 | 8/2014 | Sreedharan et al. | |
| 9,223,888 B2 * | 12/2015 | Hutchings | G06F 17/3089 |
| 9,712,576 B1 * | 7/2017 | Gill | H04L 65/403 |
| 2005/0132042 A1 * | 6/2005 | Cryer | H04L 63/0227 709/224 |
| 2008/0163380 A1 * | 7/2008 | Liu | G06F 17/30902 726/28 |
| 2009/0055929 A1 * | 2/2009 | Lee | H04L 29/12066 726/23 |
| 2011/0191849 A1 | 8/2011 | Jayaraman et al. | |
| 2012/0117649 A1 * | 5/2012 | Holloway | H04L 63/1458 726/24 |
| 2012/0240183 A1 | 9/2012 | Sinha | |
| 2013/0036468 A1 * | 2/2013 | Georgiev | H04L 61/1511 726/23 |

(Continued)

OTHER PUBLICATIONS

Fortinet, "Inside FortiOS: Web Filtering," http://docs.fortinet.com/uploaded/files/1103/inside-fortios-web-filtering-50.pdf, Jan. 9, 2014, 4 pages.

(Continued)

*Primary Examiner* — Michael R Vaughan
(74) *Attorney, Agent, or Firm* — Harrity & Harrity, LLP

(57) ABSTRACT

A device may receive a request to access a resource. The resource may be associated with resource information. The device may obtain rating information based on receiving the request. The rating information may identify a rating associated with the resource. The device may apply an access rule based on the rating information. The access rule may identify an access indicator to generate based on the rating information. The access indicator may indicate an action to perform related to the resource. The device may generate the access indicator based on applying the access rule to the rating information. The device may store, locally in one or more memories, information that indicates an association between the access indicator and the resource information.

20 Claims, 10 Drawing Sheets

(56) References Cited

U.S. PATENT DOCUMENTS

| | | | |
|---|---|---|---|
| 2013/0239212 A1* | 9/2013 | Bennett | H04L 63/1441 726/22 |
| 2014/0173730 A1* | 6/2014 | Bejerasco | G06F 21/50 726/22 |
| 2014/0282867 A1* | 9/2014 | Choi | H04L 61/1511 726/3 |
| 2014/0380472 A1* | 12/2014 | Peterson | H04L 63/1416 726/23 |
| 2015/0082426 A1* | 3/2015 | Palan | G06Q 10/0635 726/22 |
| 2015/0096018 A1* | 4/2015 | Mircescu | G06F 21/56 726/23 |
| 2015/0288711 A1* | 10/2015 | Jorgensen | H04L 63/1441 726/23 |
| 2015/0319191 A1* | 11/2015 | Georgiev | H04L 61/1511 726/23 |
| 2016/0119379 A1* | 4/2016 | Nadkarni | H04L 63/20 726/1 |

OTHER PUBLICATIONS

Wikipedia, "Fortinet," http://en.wikipedia.org/wiki/Fortinet, Dec. 7, 2014, 7 pages.

\* cited by examiner

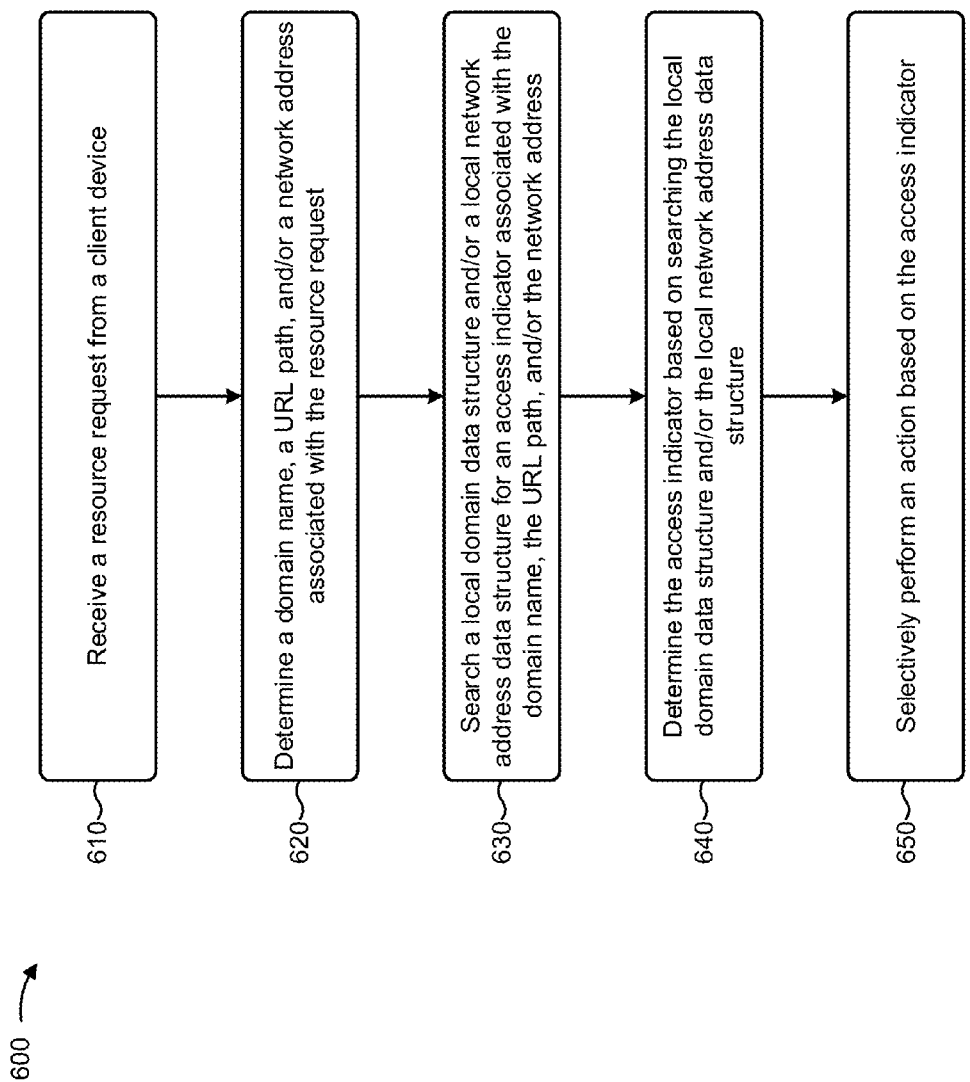

US 9,948,649 B1

INTERNET ADDRESS FILTERING BASED ON A LOCAL DATABASE

BACKGROUND

A network operator may use a network security device to control access to a resource by a client device, via a network. The resource may be identified by resource information. The resource information may include, for example, a uniform resource identifier (URI) or an internet protocol (IP) address.

SUMMARY

According to some possible implementations, a method may include receiving, by a device, a first request to access a resource. The resource may be associated with resource information. The method may include requesting, by the device and from a rating server, rating information, based on receiving the first request. The rating information may identify a rating associated with the resource. The method may include receiving, by the device and from the rating server, the rating information, based on requesting the rating information. The method may include generating, by the device and based on the rating information, an access indicator. The access indicator may indicate an action to perform related to the resource. The method may include storing, locally by the device, information that indicates an association between the access indicator and the resource information.

According to some possible implementations, a device may include one or more memories and one or more processors connected to the one or memories. The one or more processors may receive a request to access a resource. The resource may be associated with resource information. The one or more processors may obtain rating information based on receiving the request. The rating information may identify a rating associated with the resource. The one or more processors may apply an access rule based on the rating information. The access rule may identify an access indicator to generate based on the rating information. The access indicator may indicate an action to perform related to the resource. The one or more processors may generate the access indicator based on applying the access rule to the rating information. The one or more processors may store, locally in the one or more memories, information that indicates an association between the access indicator and the resource information.

According to some possible implementations, a computer-readable medium may store one or more instructions that, when executed by one or more processors, cause the one or more processors to receive a first resource request. The first resource request may be a request to access a resource. The resource may be associated with resource information. The one or more instructions may cause the one or more processors to request rating information based on the resource information. The one or more instructions may cause the one or more processors to receive the rating information. The one or more instructions may cause the one or more processors to generate, based on the rating information, an access indicator. The access indicator may indicate an action to perform related to the resource. The one or more instructions may cause the one or more processors to store, locally, information that indicates an association between the access indicator and the resource information. The one or more instructions may cause the one or more processors to receive a second resource request. The second resource request may include the resource information. The second resource request may be another request to access the resource that is received after the information that indicates the association between the access indicator and the resource information is stored. The one or more instructions may cause the one or more processors to identify the access indicator associated with the resource information. The one or more instructions may cause the one or more processors to perform the action, associated with the resource, for the second resource request.

BRIEF DESCRIPTION OF THE DRAWINGS

FIG. 6 is a flow chart of an example process for controlling access to a resource based on an access indicator;

DETAILED DESCRIPTION

Figure 1A:
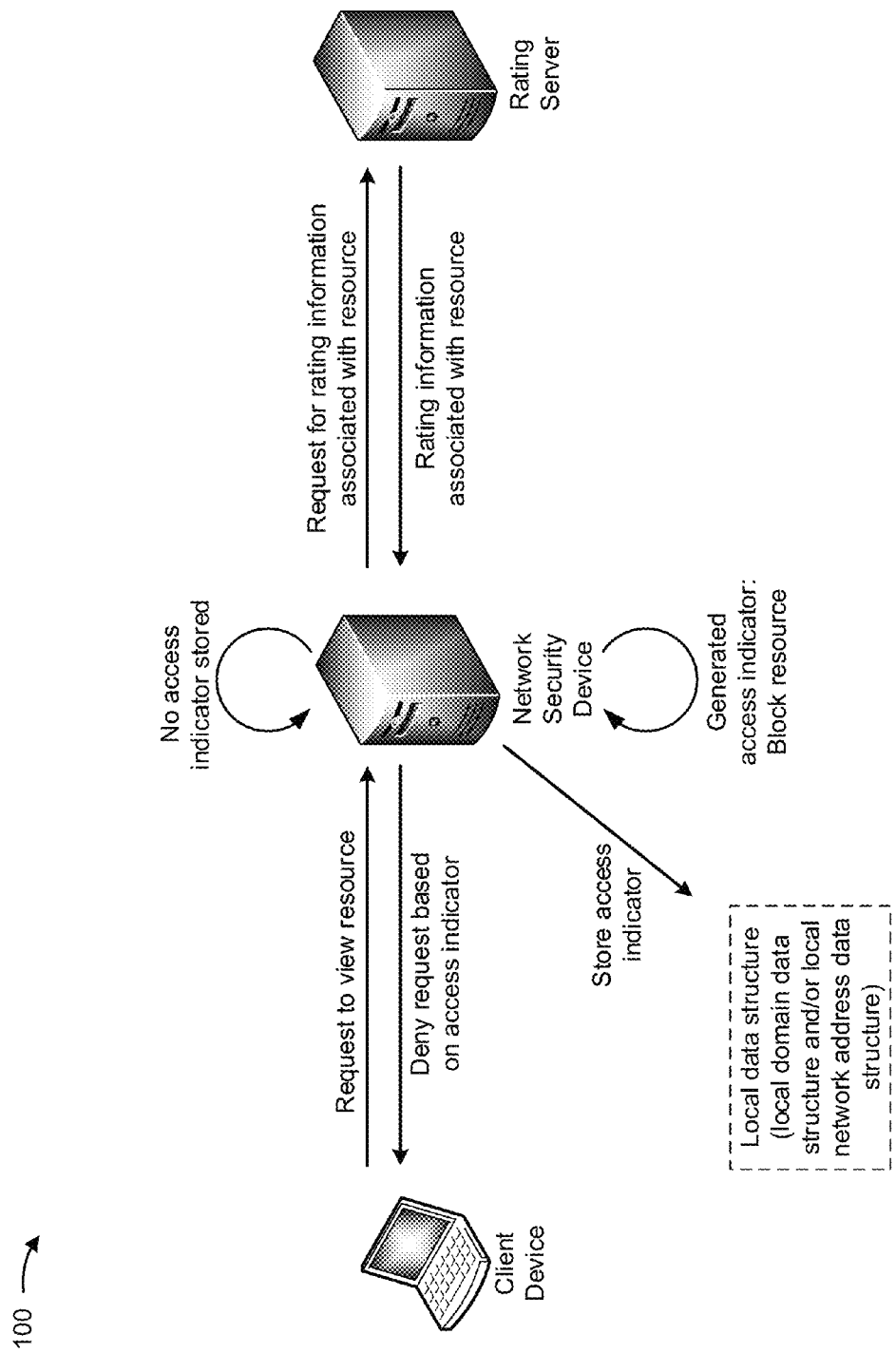
FIGS. 1A and 1B are diagrams of an overview of an example implementation described herein.

The following detailed description of example implementations refers to the accompanying drawings. The same reference numbers in different drawings may identify the same or similar elements.

A network operator (e.g., an internet service provider, an employer, an education institution, or the like) may provide a network accessible by a client device. The client device may request access to a resource via the network (e.g., a website, a webpage, an embedded resource, such as a streaming video, a service, such as an email service or a file transfer protocol service, or the like). The resource may be identified by resource information (e.g., a network address, such as an IP address, a uniform resource locator (URL), a uniform resource identifier (URI), a URL path, or the like). When the client device attempts to access a resource associated with a URL, a URI, or a URL path, a network device associated with the network may determine an IP address associated with the URL, the URI, or the URL path (e.g., by a domain name service (DNS) lookup, or the like), in order to provide the client device access to the resource.

The network operator may use a network security device to control access to the resource by the client device. To control access to the resource by the client device, the network operator, or another party, may associate the resource information with an access indicator (e.g., an indicator that indicates to the network security device that access to the resource is to be allowed, is to be denied, is to be monitored, is to be redirected, or the like). The network security device, upon receiving the request to access the resource, may determine the access indicator associated with the resource information (e.g., by requesting the access indicator from a third party, by generating the access indicator based on information received from a third party, or the like). However, the network security device may not store the resource information and/or the access indicator locally, and thus may be required to request the access indicator, or information used to generate the access indicator, from the third party, each time resource information is received. Repetitively requesting the access indicator or the information used to generate the access indicator from the third party may slow operation of the network security device and may increase network traffic. Further, the device that stores the access indicator may not be configured to determine certain types of resource information or to associate the access indicator with certain types of resource information (e.g., an IP address, or the like), and thus may not be capable of controlling access to the resource via the certain types of resource information.

Implementations described herein may assist the network operator in controlling access to the resource by the client device. After receiving a URL, a URI, or a URL path, the network security device may determine an access indicator corresponding to the URL, the URI, or the URL path. The network security device may determine an IP address associated with the resource, based on the URL, the URI, or the URL path. The network security device may further associate the IP address and the access indicator, and may store the IP address, the URL, the URI, the URL path, and/or the access indicator locally, in one or more local data structures. When the client device, or another device, attempts to access the resource, the network security device may determine the access indicator based on the locally stored information, and may control access to the resource by the client device accordingly. In this way, the network security device may control the access to the resource by the client device via a variety of resource information types. The network security device may further improve efficiency and decrease latency of the network by storing the access indicator locally. As the network security device determines and stores access indicators, the network security device will continuously improve the coverage of the one or more local data structures.

Figure 1B:
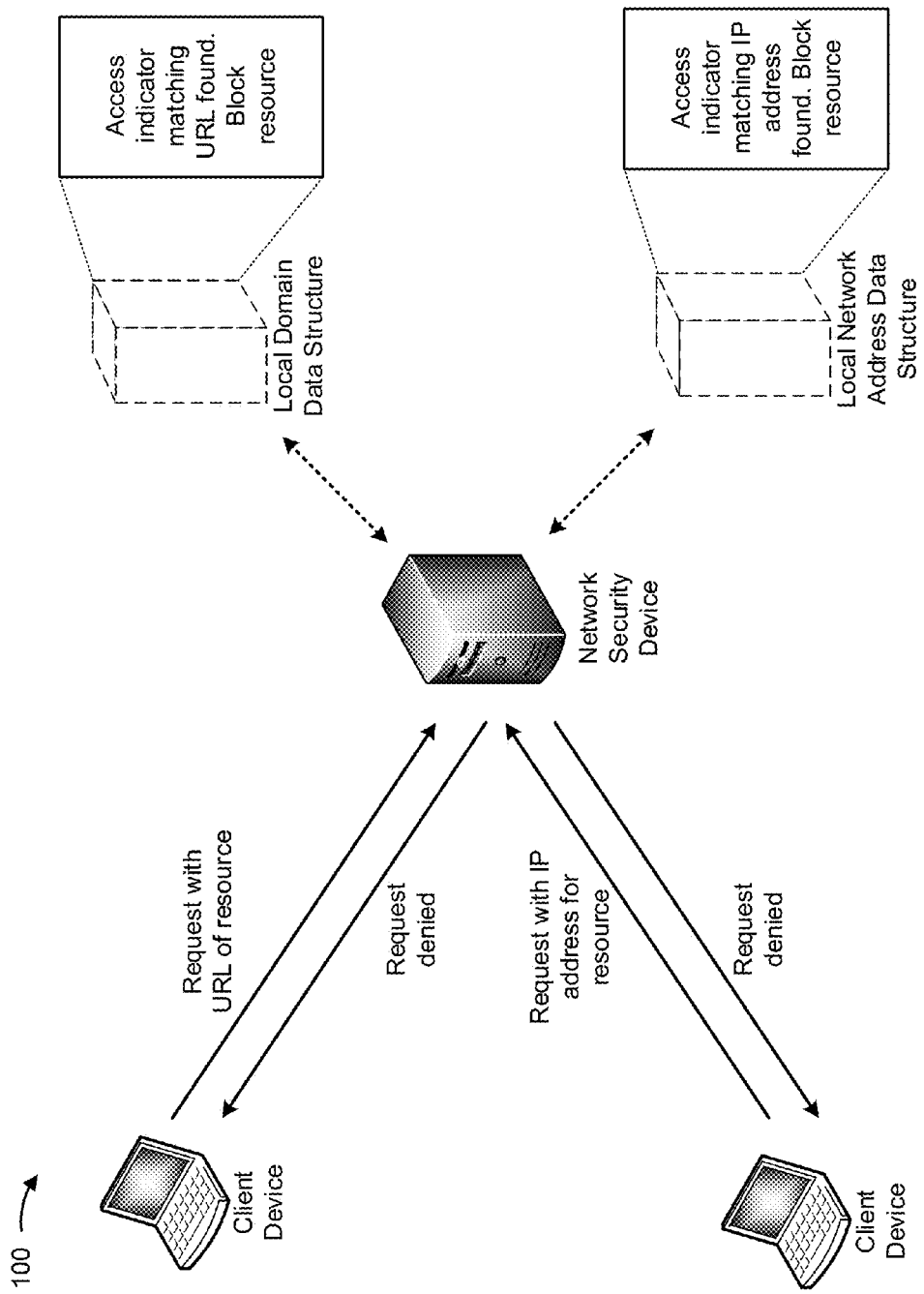

FIGS. 1A and 1B are diagrams of an overview of an example implementation 100 described herein. For the purpose of FIGS. 1A and 1B, assume that a rating server stores rating information that is associated with a webpage.

As shown in FIG. 1A, a client device may transmit a request, to a network security device, to view a resource. Assume that the request to view the resource includes a URL that identifies resource information of the resource. As shown, the network security device may determine that an access indicator associated with the URL is not stored in a local data structure. As shown, the network security device may transmit a request for rating information to a rating server. The rating server may determine rating information associated with the URL, and may transmit the rating information associated with the resource to the network security device.

As further shown in FIG. 1A, the network security device may generate an access indicator based on the rating information. Assume that the network security device determines an IP address associated with the resource by performing a DNS lookup based on the URL. Assume further that the network security device associates the IP address, the URL, and the access indicator. As shown, the network security device may store the access indicator, the IP address, and the URL in one or more local data structures. Assume that the IP address and the access indicator are stored in a local network address data structure, and that the URL and the access indicator are stored in a local domain data structure, as shown in FIG. 1B.

For the purpose of FIG. 1B, the two client devices shown need not include the same client device, and need not include the client device shown in FIG. 1A. As shown in FIG. 1B, a client device may transmit a request, to the network security device, to view the resource. As shown, the request may include a URL of the resource. As further shown, the network security device may determine, based on information stored in a local domain data structure, that the URL is associated with an access indicator. Assume that the access indicator indicates that access to the URL is to be denied. As shown, the network security device may deny the client device access to the resource, based on the access indicator stored in the local domain data structure.

As further shown in FIG. 1B, another client device may transmit a request to view the resource. As shown, the request to view the resource may include an IP address associated with the webpage. As further shown, the network security device may determine, based on information stored in a local network address data structure, that the IP address is associated with an access indicator. Assume that the access indicator indicates that access to the IP address is to be denied. As shown, the network security device may deny the other client device access to the resource, based on the access indicator stored in the local network address data structure.

In this way, the network security device may locally store the access indicator, rather than querying a rating server for each request. As the network security device locally stores more access indicators, the network security device will need to transmit fewer requests for rating information, thus improving network performance. The network security device may associate the access indicator with the IP address and the URL, and may locally store the IP address and the URL. By locally storing the IP address, the URL, and the access indicator, the network security device may more quickly determine the access indicator. The network security device may also control access to the resource based on the IP address associated with the webpage. The network security device may decrease network traffic by processing resource requests locally instead of transmitting resource requests elsewhere for processing. Further, the network security device may be configured to filter network traffic based on a custom access rule defined by the network operator or another entity.

Figure 2:
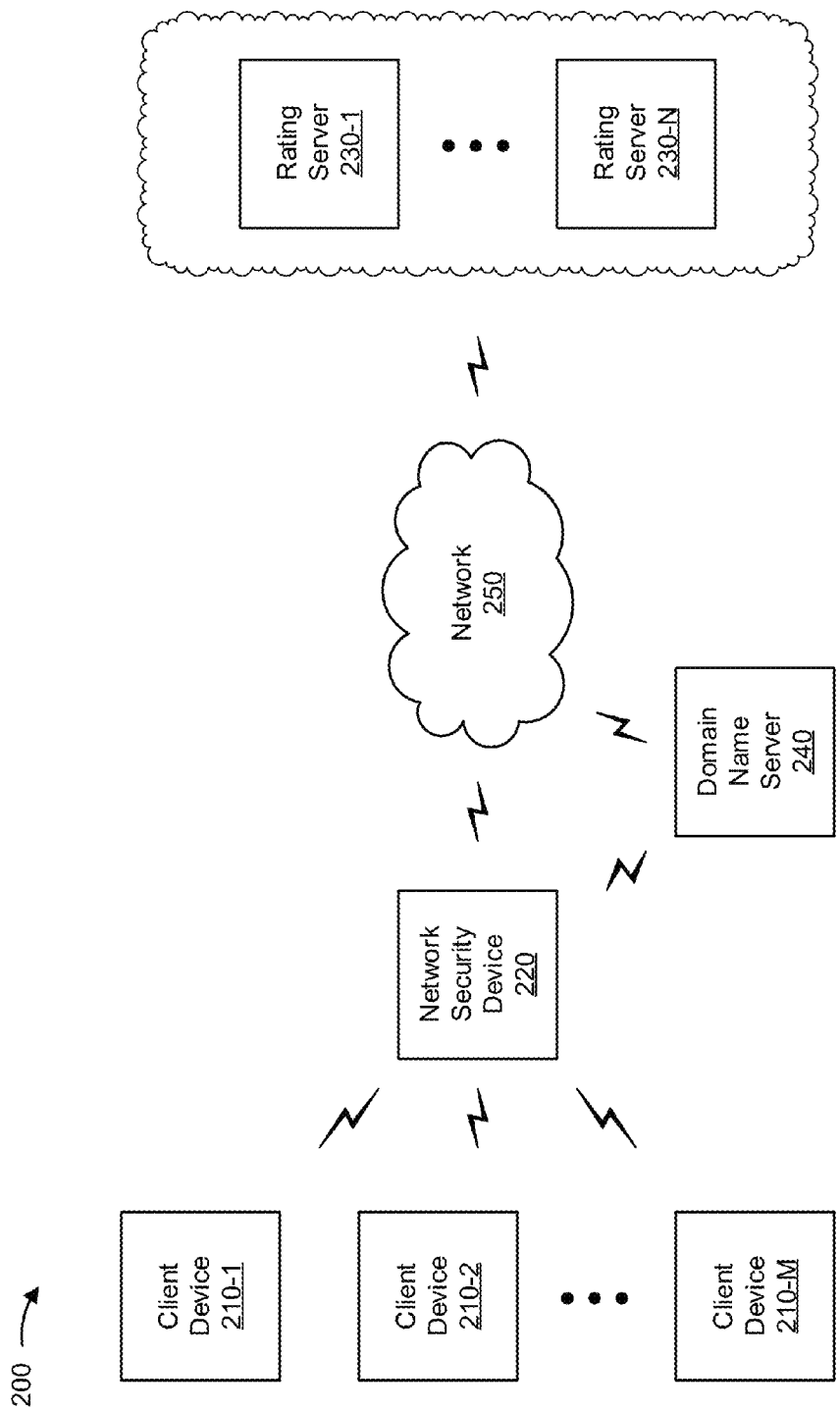
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-M (M≥1) (hereinafter referred to collectively as "client devices 210," and individually as "client device 210"), a network security device 220, one or more rating servers 230-1 through 230-N (N≥1) (hereinafter referred to collectively as "rating servers 230," and individually as "rating server 230"), a domain name server 240, and a network 250. Devices of environment 200 may interconnect via wired connections, wireless connections, or a combination of wired and wireless connections.

Client device 210 may include one or more devices capable of receiving, generating, storing, processing, and/or providing information. For example, client device 210 may include a computing device, such as a mobile phone (e.g., a smart phone, a radiotelephone, etc.), a desktop computer, a laptop computer, a tablet computer, a handheld computer, a gaming device, a set-top box, a server, or a similar type of device. In some implementations, client device 210 may receive information from and/or transmit information to network security device 220. In some implementations, client device 210 may request access to a resource, and network security device 220 may process the request.

Network security device 220 may include one or more devices (e.g., one or more traffic transfer devices) capable of processing and/or transferring network traffic. For example, network security device 220 may include a firewall, a router, a gateway, a switch, a hub, a bridge, a reverse proxy, a server (e.g., a proxy server), a security device, an intrusion detection device, a load balancer, or a similar device. In some implementations, network security device 220 may store information related to network access control. In some implementations, network security device 220 may receive a request from client device 210 to access a resource, and may process the request.

In some implementations, network security device 220 may be positioned as a gateway between a first network (e.g., a private network), including one or more client devices 210, and a second network (e.g., a public network) which may include other client devices 210 and/or other network security devices 220. Alternatively, or additionally, network security device 220 may be positioned as a proxy for client devices 210.

Rating server 230 may include one or more devices capable of storing, processing, and/or providing rating information. For example, rating server 230 may include a server or a similar device. In some implementations, rating server 230 may include a communication interface that allows rating server 230 to receive information from and/or transmit information to other devices in environment 200. In some implementations, rating server 230 may store rating information associated with a resource (e.g., information used by network security device 220 to generate an access indicator associated with the resource). Rating server 230 may provide the rating information to network security device 220. Network security device 220 may process a request to access a resource from client device 210 based on the rating information and/or a stored access indicator that is determined based on the rating information.

Domain name server 240 may include one or more devices capable of storing, processing, and/or providing domain name information. For example, domain name server 240 may include a server or a similar device. In some implementations, domain name server 240 may store domain name information that identifies a domain name and a network address (e.g., an IP address) associated with the domain name. In some implementations, domain name server 240 may receive a request for the domain name information (e.g., a DNS lookup, a DNS request, or the like) from client device 210 and/or network security device 220, including a domain name and requesting an IP address associated with the domain name. Domain name server 240 may provide the domain name information, based on the request for the domain name information.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
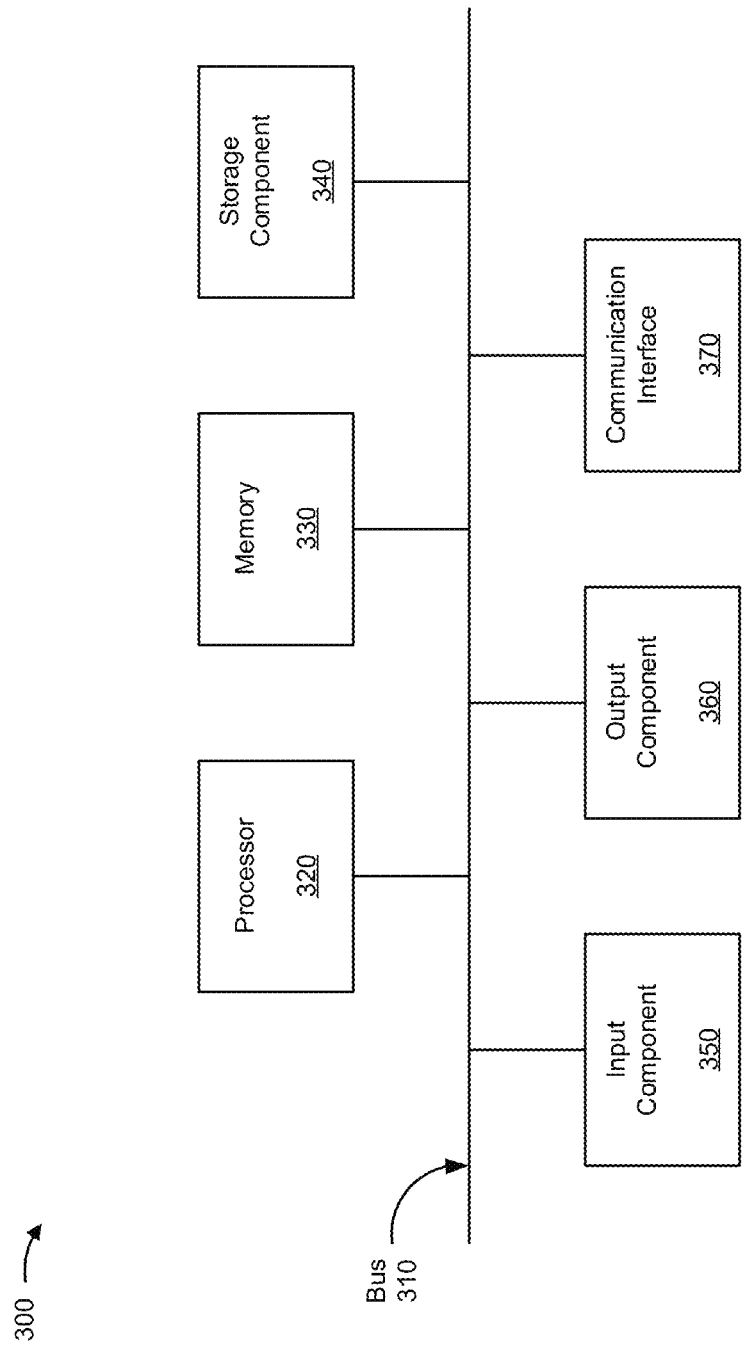
FIG. 3 is a diagram of example components of one or more devices of FIG. 2.

FIG. 3 is a diagram of example components of a device 300. Device 300 may correspond to client device 210, network security device 220, rating server 230, and/or domain name server 240. In some implementations, client device 210, network security device 220, rating server 230, and/or domain name server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
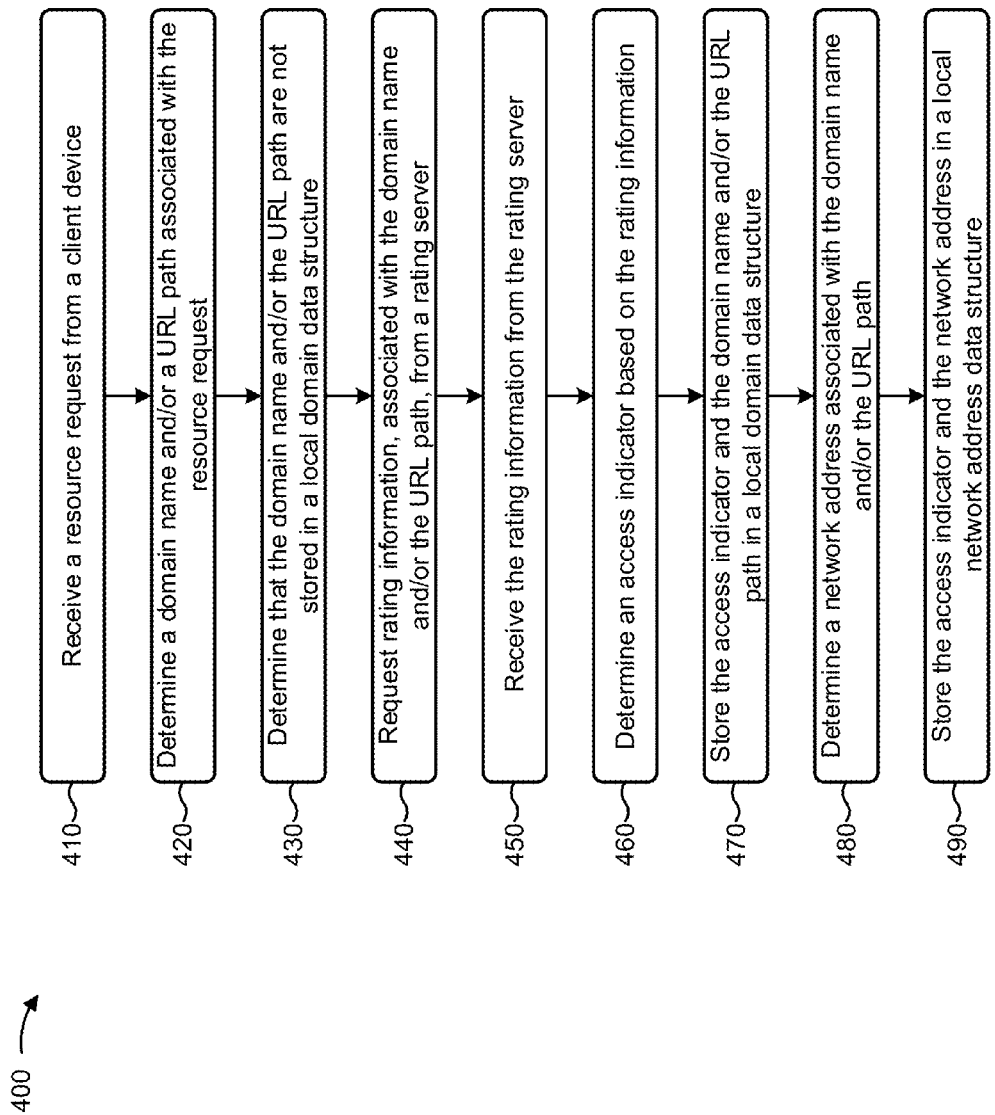
FIG. 4 is a flow chart of an example process for determining and storing an access indicator.

FIG. 4 is a flow chart of an example process 400 for determining and storing an access indicator. In some implementations, one or more process blocks of FIG. 4 may be performed by network security device 220. In some implementations, one or more process blocks of FIG. 4 may be performed by another device or a group of devices separate from or including network security device 220, such as client device 210 and/or rating server 230.

As shown in FIG. 4, process 400 may include receiving a resource request from a client device (block 410). For example, network security device 220 may receive a resource request from client device 210, indicating that client device 210 wants to access a resource. The resource request may include resource information, such as a URL, a URI, an IP address, or the like, associated with the resource. In some implementations, the resource request may include a DNS request (e.g., a request, intended for domain name server 240, to determine an IP address associated with a domain name), a hypertext transfer protocol (HTTP) request (e.g., a request, to a server, for a resource identified by a URL, a URI, or the like), and/or another type of request. In some implementations, network security device 220 may receive an email, destined for a destination email address associated with a domain name. The resource may include a website, a webpage, an embedded resource such as a streaming video, a file, a service such as an email service or a file transfer protocol service, or the like.

As further shown in FIG. 4, process 400 may include determining a domain name and/or a URL path associated with the resource request (block 420). For example, network security device 220 may determine a domain name and/or a URL path associated with the resource request. The domain name may include part or all of the URL and/or the URI (e.g., for a URL of www.example.com/123, the domain name may include www.example.com). The URL path may include part of the URL and/or the URI (e.g., for the URL of www.example.com/123, the URL path may include /123), and may identify a webpage or a file associated with the resource. In some implementations, network security device 220 may determine a domain name associated with a destination email address. In some implementations, network security device 220 may determine the domain name and/or the URL path by parsing the resource request.

Additionally, or alternatively, the resource request may associate the domain name and/or the URL path with a tag (e.g., by associating a particular character, a predetermined character, a particular string of characters, or the like, with the domain name and/or the URL path). Network security device 220 may determine the domain name and/or the URL path based on the tag. For example, assume that the resource request associates the domain name with a tag of "domain=", and the URL path with a tag of "filename=". Assume further that network security device 220 transmits a resource request for a resource with a domain name of "www.xyz.com" and a URL path of "/index/123". In that case, the resource request may include "domain=www.xyz.com" and "URLpath=/index/123", corresponding to the tags associated with the domain name and the URL path.

As further shown in FIG. 4, process 400 may include determining that the domain name and/or the URL path are not stored in a local domain data structure (block 430). For example, network security device 220 may determine that the domain name and/or the URL path are not stored in a local domain data structure associated with network security device 220. In some implementations, network security device 220 may perform a memory lookup to determine that the domain name and/or the URL path are not stored in the local domain data structure. The local domain data structure may store information identifying an association between an access indicator and a domain name and/or a URL path.

As further shown in FIG. 4, process 400 may include requesting rating information, associated with the domain name and/or the URL path, from a rating server (block 440). For example, network security device 220 may request rating information, associated with the domain name and/or the URL path, from rating server 230. In some implementations, network security device 220 may request rating information based on determining that the domain name and/or the URL path are not stored in the local domain data structure. The request may include resource information (e.g., a domain name, a URL path, an IP address, or the like), an identity of client device 210 and/or network security device 220, a credential (e.g., a password or the like, used by rating server 230 to authenticate network security device 220), or the like.

The rating information may include information related to controlling access to a resource. For example, the rating information may include information identifying a resource as associated with a risk (e.g., a resource may be associated with a virus, malware, and/or adware, may be illegal, may be incompatible with client device 210, or the like), associated with a certain type of content (e.g., streaming audio and/or video content, downloadable content, adult content, content not suitable for a work environment, etc.), or the like. In some implementations, the rating information may include a site reputation identifier (e.g., that identifies a risk, a category, or the like, associated with a particular host name). Additionally, or alternatively, the rating information may include a URL rating identifier (e.g., that identifies a risk, a category, or the like, associated with a particular URL). In some implementations, the rating information may include a number, or may include a string (e.g., safe, not safe, etc.), a category associated with the resource, a file type associated with the resource, a geographical location of the resource, or the like.

As further shown in FIG. 4, process 400 may include receiving the rating information from the rating server (block 450). For example, network security device 220 may receive the rating information, from rating server 230, based on requesting the rating information. In some implementations, rating server 230 may be implemented by the network operator. In some implementations, rating server 230 may be implemented by a party that provides or implements network security device 220. Additionally, or alternatively, rating server 230 may be implemented by another party, such as a third party vendor, a government agency, or the like.

In some implementations, rating server 230 may be implemented as part of a cloud-based service. In this way, multiple, different network security devices 220, associated with a variety of networks in a variety of geographical locations, may request rating information from rating server 230. In some implementations, rating server 230 may be implemented locally, and may be associated with or a component of a particular network security device 220. In this way, the particular network security device 220 may more quickly determine rating information.

As further shown in FIG. 4, process 400 may include determining an access indicator based on the rating information (block 460). For example, after receiving the rating information, network security device 220 may determine an access indicator based on the rating information. The access indicator may indicate that client device 210 is to be permitted to access the resource, that client device 210 is to be denied access to the resource, that client device 210 is to be permitted access to the resource and monitored, that network traffic associated with the resource is to be redirected before reaching client device 210, or the like. In some implementations, the access indicator may define a first rule for a first client device 210, a second rule for a second client device 210, and so on.

In some implementations, network security device 220 may generate an access indicator based on an access rule and on rating information. The access rule may be based on a threshold rating associated with a resource, a category associated with a resource (e.g., a sports website, a humor website, or another type of category), a type of a resource (e.g., a streaming video resource, an executable file resource, or the like), a source network address, a destination network address, a source network port, a destination network port, a protocol type (e.g., a transmission control protocol (TCP), a user datagram protocol (UDP), a simple mail transfer protocol (SMTP), etc.) or the like. For example, assume that a rating for a particular type of resource represents a risk associated with the particular type of resource, and is formatted as an integer between and including 1 through 5. Assume further that a higher integer indicates a higher risk (e.g., that a rating of 5 indicates a highest risk, and that a rating of 1 indicates a lowest risk). Assume that network security device 220 is configured with an access rule to block access to resources associated with a rating of 4 or 5, and is configured with an access rule to allow access to resources associated with a rating of 1, 2, or 3. Assume further that network security device 220 receives rating information that indicates that a first resource is associated with a rating of 5, and that a second resource is associated with a rating of 3. Network security device 220 may generate a first access indicator to block access to the first resource, and may generate a second access indicator to allow access to the second resource, based on the access rules and the rating information. In this way, a network operator may control access to a resource by creating access rules for network security device 220.

In some implementations, the access rules created by the network operator may be customizable to cause an action related to a file type. For example, assume that a network operator wants to block resources including a .zip file or a .7z file. Assume further that rating server 230 stores rating information that identifies resources that include a .zip file or a .7z file, and transmits the rating information to network device 220 based on a rating request. The network operator may configure network security device 220 to enforce an access rule that denies access by client device 210 to resources that include a .zip file or a .7z file. Based on the access rule and on receiving the rating information from rating server 230, network security device 220 may generate an access indicator denying access to the resources. Network security device 220 may deny access, by client device 210, to resources that include a .zip file or a .7z file. In this way, the network operator may create and enforce custom access rules using network security device 220.

In some implementations, the access rules created by the network operator may be customizable to cause an action related to a content type. For example, assume that a network operator wants to block resources that include adult content. Assume further that rating server 230 stores rating information that identifies resources that include adult content, and transmits the rating information to network device 220 based on a rating request. The network operator may configure network security device 220 to enforce an access rule that denies access by client device 210 to resources that include adult content. Based on the access rule and on receiving the rating information from rating server 230, network security device 220 may generate an access indicator denying access to the resources. Network security device 220 may deny access, by client device 210, to resources that include adult content. In this way, the network operator may create and enforce custom access rules using network security device 220.

In some implementations, the access rules created by the network operator may be customizable to cause an action related to a domain name. For example, assume that a network operator wants to block email destined for an email address associated with any domain name other than a particular domain name. The network operator may configure network security device 220 to enforce an access rule that allows access, by client device 210, to email resources associated with a white list. The network operator may provide rating information that associates only the particular domain name with a white list (e.g., the network operator may provide rating information, to network security device 220, that permits client device 210 access to the particular domain name, and denies client device 210 access to any other domain). Network security device 220 may generate an access indicator that allows client device 210 to email only the particular domain name, based on the access rule and on the rating information. In this way, the network operator may create and enforce custom access rules using network security device 220.

In some implementations, the access rules created by the network operator may be customizable to cause an action related to multiple, different factors. For example, assume that rating device 230 stores rating information including a rating for a particular type of resource. Assume that the rating represents a risk associated with the particular type of resource, and is formatted as an integer between and including 1 through 5. Assume further that a higher integer indicates a higher risk (e.g., that a rating of 5 indicates a highest risk, and that a rating of 1 indicates a lowest risk). Assume that the rating information further identifies a resource as either a .zip file or a non-.zip file. Assume that a network operator wants to block access to a non-.zip file associated with a rating of 5, and wants to block access to a .zip file associated with a rating of 3, 4, or 5. Assume further that rating server 230 transmits the rating information to network device 220 based on a rating request.

The network operator may configure network security device 220 to enforce an access rule to block access to a non-.zip file associated with a rating of 5, and to block access to a .zip file associated with a rating of 3, 4, or 5. Based on the access rule and on receiving the rating information from rating server 230, network security device 220 may generate an access indicator denying access to the resources. Network security device may deny access, by client device 210, to a .zip file associated with a rating of 3, 4, or 5, and to a non-.zip file associated with a rating of 5. In this way, a network operator may create and enforce custom access rules based on multiple, different factors.

As further shown in FIG. 4, process 400 may include storing the access indicator and the domain name and/or the URL path in a local domain data structure (block 470). For example, network security device 220 may store the access indicator and the domain name and/or the URL path in a local domain data structure. In some implementations, the local domain data structure may store an indication of an association between a domain name and an access indicator, between a URL path and an access indicator, between an access indicator and a combination of a domain name and a URL path, or the like.

In some implementations, the local domain data structure may be locally stored on network security device 220 and/or a component of network security device 220. In this way, network security device 220 may more quickly access the local domain data structure to determine the access indicator. Network security device 220 may continually improve the local domain data structure by including more domain names and access indicators as more resource requests are processed.

As further shown in FIG. 4, process 400 may include determining a network address associated with the domain name and/or the URL path (block 480). For example, network security device 220 may determine a network address associated with the domain name and/or the URL path. In some implementations, network security device 220 may determine the network address by requesting the network address from domain name server 240, based on the domain name. Additionally, or alternatively, network security device 220 may query the resource identified by the resource request to determine the network address (e.g., by pinging the resource, or the like). In some implementations, network security device 220 may use the resource request to determine the network address (e.g., if the resource request is a DNS request, network security device 220 may forward the resource request to domain name server 240, and may receive a network address from domain name server 240 based on the resource request). In some implementations, network security device 220 may determine multiple, different resource addresses associated with the domain name and/or the URL path. For example, a single domain name and/or URL path may be associated with multiple IP addresses.

As further shown in FIG. 4, process 400 may include storing the access indicator and the network address in a local network address data structure (block 490). For example, network security device 220 may associate the network address and the access indicator. Network security device 220 may store the access indicator and the network address in a local network address data structure. In some implementations, the local network address data structure may be locally stored on network security device 220 or a component of network security device 220. In some implementations, the local network address data structure and the local domain data structure may be stored as a single data structure, or alternatively as multiple, different data structures. In this way, network security device 220 may more quickly access the local network address data structure to determine the access indicator. Network security device 220 may also continuously add access indicators and resource information to the local data structures, thus improving the comprehensiveness of the local data structures and reducing network traffic, by minimizing the quantity of times network security device 220 requests rating information from rating device 230.

In some implementations, the local network address data structure and/or the local domain data structure may be generated by a third party. For example, assume that a third party, such as a web filtering company, provides resource information filtering service. The web filtering company may provide resource information filtering information related to filtering network traffic based on resource information. The network operator associated with network security device 220 may use the resource information filtering information to generate the local data structures associated with network security device 220. For example, network security device 220 may request, from rating server 230 or another device, and may receive the local data structures for local storage by network security device 220. Additionally, or alternatively, the network operator may provide the information in the local data structures directly to network security device 220 (e.g., may provide, to network security device 220, a "white list" of permitted resources, a "black list" of blocked resources, a custom category of resources, or the like). In this way, a network operator may control access to a resource without requiring network security device 220 to first generate the local data structures during the course of operation.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
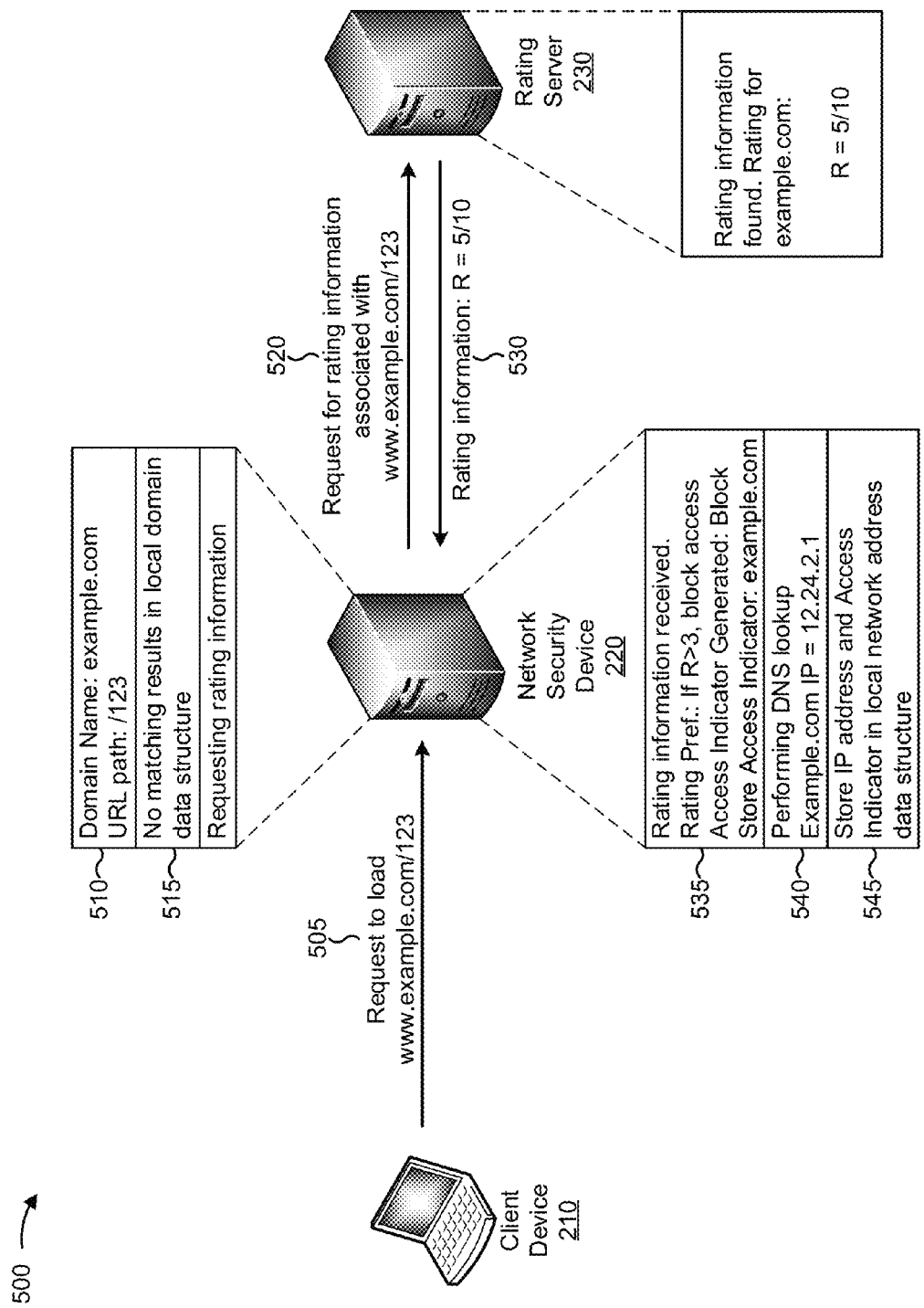
FIGS. 5A and 5B are diagrams of an example implementation relating to the example process shown in FIG. 4.
Figure 5B:
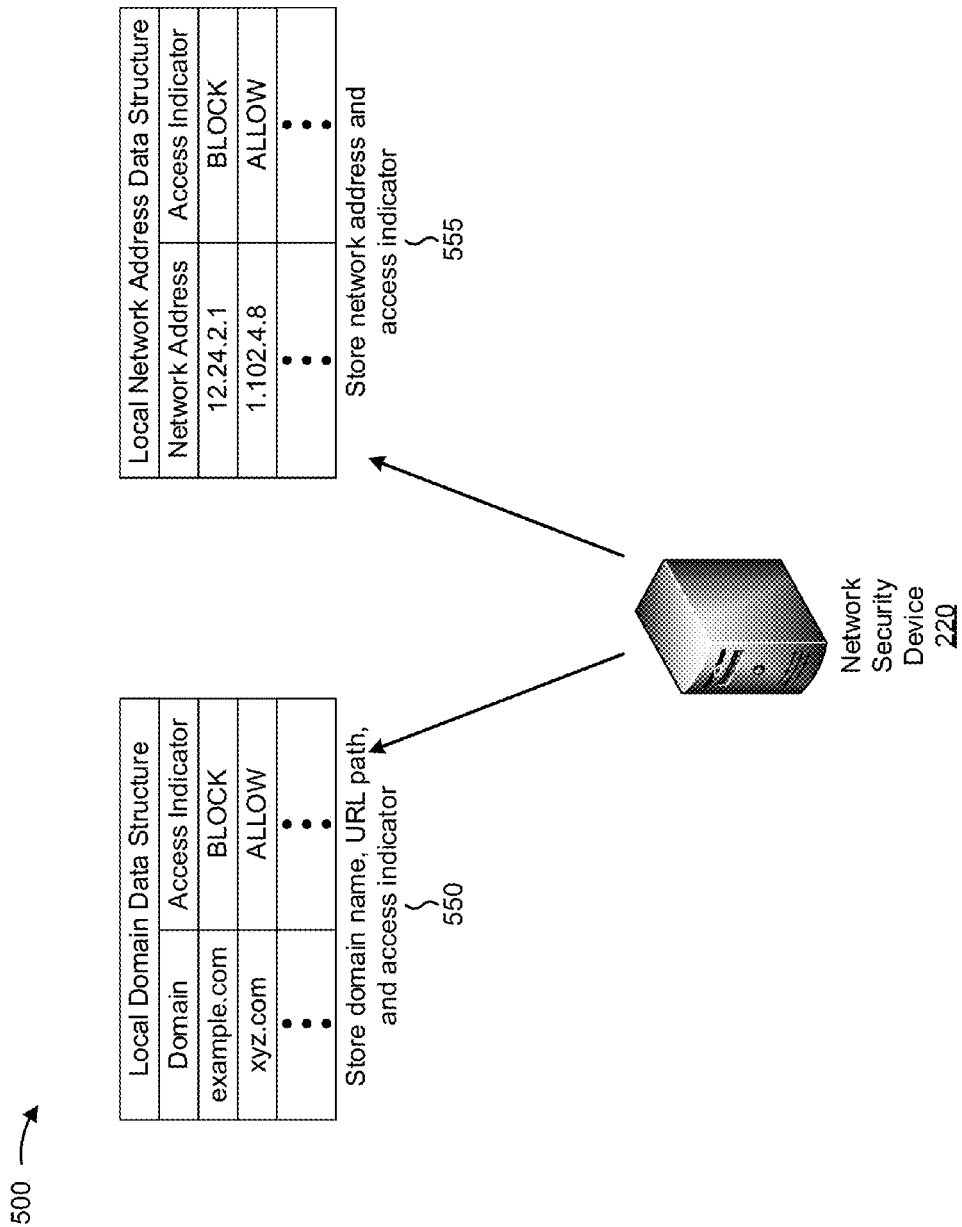

FIGS. 5A and 5B are diagrams of an example implementation 500 relating to example process 400 shown in FIG. 4. FIGS. 5A and 5B show an example of determining and storing an access indicator. For the purpose of FIGS. 5A and 5B, assume that a resource is associated with a URL of www.example.com/123 and an IP address of 12.24.2.1. Assume further that network security device 220 is configured to block access by client device 210 to any resource associated with a rating greater than R=3/10 (e.g., a rating of 3 on a scale of 1 to 10, with 1 being safest and 10 being riskiest).

As shown in FIG. 5A, and by reference number 505, client device 210 may transmit a resource request, requesting access to a resource associated with a URL of www.example.com/123. Network security device 220 may receive the resource request. As shown by reference number 510, network security device 220 may determine a domain name (here, www.example.com) and a URL path (here, /123) associated with the URL. As shown by reference number 515, network security device 220 may determine that the domain name and/or the URL path do not match an access indicator stored in a local domain data structure.

As shown by reference number 520, based on determining that the domain name and/or the URL path do not match a locally stored access indicator, network security device 220 may request, from rating server 230, rating information associated with the URL. Assume that rating server 230 stores rating information associated with the domain name of www.example.com (here, a rating of R=5/10). As shown, rating server 230 may identify the rating information associated with the domain name of example.com. As shown by reference number 530, rating server 230 may provide the rating information to network security device 220.

As shown by reference number 535, network security device 220 may receive the rating information. As shown, network security device 220 may generate an access indicator based on the rating information. Here, network security device 220 is configured to block access by client device 210 to any resource associated with a rating greater than R=3/10. Based on this rule, and on the rating of R=5/10 associated with the domain name of www.example.com, network security device 220 generates an access indicator indicating that access to the resource is to be blocked.

As shown by reference number 540, network security device 220 may determine the IP address associated with the access indicator. Assume that network security device 220 provides the URL to domain name server 240 and receives the IP address of 12.24.2.1 from domain name server 240 (not shown). As shown by reference number 545, network security device 220 may store the IP address and the access indicator in a local network address data structure.

As shown in FIG. 5B, and by reference number 550, network security device 220 may store the domain name and the access indicator in a local domain data structure. In some implementations, network security device 220 may also store the URL path and the access indicator. As shown by reference number 555, network security device 220 may store the network address and the access indicator in a local network address data structure. This is an example implementation, and in some cases, network security device 220 may only store the domain name and the access indicator (e.g., not the IP address).

In this way, network security device 220 may determine an access indicator for a resource, and may store the access indicator, a domain name of the resource, a URL path of the resource, and/or a network address of the resource in local data structures. Network security device 220 may determine the access indicator based on a custom rule implemented by a network operator associated with network security device 220. Network security device 220 may continue to determine and store access indicators and resource information, and may thus develop a more extensive data structure of locally stored access indicators and resource information. In this way, network security device 220 may improve network efficiency by reducing a quantity of requests to rating server 230 and/or domain name server 240.

As indicated above, FIGS. 5A and 5B are provided merely as an example. Other examples are possible and may differ from what was described with regard to FIGS. 5A and 5B.

FIG. 6 is a flow chart of an example process 600 for controlling access to a resource based on an access indicator. In some implementations, one or more process blocks of FIG. 6 may be performed by network security device 220. In some implementations, one or more process blocks of FIG. 6 may be performed by another device or a group of devices separate from or including network security device 220, such as client device 210, rating server 230, and/or domain name server 240.

As shown in FIG. 6, process 600 may include receiving a resource request from a client device (block 610). For example, network security device 220 may receive a resource request from client device 210, requesting access to a resource. The resource request may include resource information. In some implementations, the resource request may include a DNS request and/or an HTTP request. In some implementations, client device 210 may be the same client device 210 that transmitted the resource request described in connection with of FIG. 4. In some implementations, client device 210 may be a different device than the client device 210 that transmitted the resource request described in connection with FIG. 4.

As further shown in FIG. 6, process 600 may include determining a domain name, a URL path, and/or a network address associated with the resource request (block 620). For example, network security device 220 may determine a domain name, a URL path, and/or a network address associated with the resource request. In some implementations, network security device 220 may determine the domain name, the URL path, and/or the network address by parsing the resource request. For example, assume that the resource request includes an IP address associated with the resource. Network security device 220 may detect the IP address by parsing the resource request. Additionally, or alternatively, the request may associate the domain name, the URL path, and/or the network address with a tag (e.g., by associating a particular character, a predetermined character, a particular string of characters, or the like, with the domain name, the URL path, and/or the network address). Network security device 220 may determine the domain name, the URL path, and/or the network address based on the tag.

As further shown in FIG. 6, process 600 may include searching a local domain data structure and/or a local network address data structure for an access indicator associated with the domain name, the URL path, and/or the network address (block 630). For example, network security device 220 may search a local domain data structure and/or a local network address data structure for an access indicator. The access indicator may be associated with the domain name, the URL path, and/or the network address. In some implementations, the local domain data structure and/or the local network address data structure may be locally stored on network security device 220 or a component of network security device 220.

As further shown in FIG. 6, process 600 may include determining the access indicator based on searching the local domain data structure and/or the local network address data structure (block 640). For example, network security device 220 may determine the access indicator based on searching the local domain data structure and/or the local network address data structure. In some implementations, network security device 220 may determine the access indicator by searching the local domain data structure for the domain name and/or the URL path associated with the access indicator. Additionally, or alternatively, network security device 220 may determine the access indicator by searching the local network address data structure for the network address associated with the access indicator.

In some implementations, network security device 220 may not determine an access indicator (e.g., if no access indicator associated with the domain name, the URL path, and/or the resource information is stored in the local data structures). In that case, network security device 220 may perform some or all of the process shown in FIG. 4. For example, network security device 220 may retrieve rating information from rating server 230, may determine an access indicator, and may store the access indicator, the domain name, the URL path, and/or the resource information in one or more local data structures.

As further shown in FIG. 6, process 600 may include selectively performing an action based on the access indicator (block 650). For example, network security device 220 may selectively perform an action, or may selectively instruct another device to perform an action, based on the access indicator. The action may include allowing client device 210 to access the resource, denying client device 210 access to the resource, closing a communication session with client device 210, dropping the resource request received from client device 210, allowing client 210 to access the resource and monitoring the access by client device 210 to the resource, redirecting network traffic associated with the resource, or the like. In some implementations, network security device 220 may indicate, to client device 210, the action performed (e.g., by causing client device 210 to display a page indicating the action performed, by transmitting a message to client device 210 indicating the action performed, or the like).

In some implementations, network security device 220 may allow client device 210 to access the resource, and may monitor the access by client device 210 to the resource. For example, assume that the access indicator indicates that access to the resource is to be monitored (e.g., the resource may be monitored for data usage, for a type of content provided to client device 210 by the resource, for a length of time spent by client device 210 accessing the resource, for a quantity of client devices 210 accessing the resource, or the like). Assume further that client device 210 requests access to the resource. Based on the access indicator, network security device 220 may allow client device 210 to access the resource. Network security device 220 may monitor the access to the resource, and/or may cause another device to monitor the access to the resource. In this way, a network operator may configure network security device 220 to monitor access to a resource by client device 210.

In some implementations, network security device 220 may redirect network traffic associated with the resource. For example, assume that the access indicator indicates that network traffic associated with the resource is to be redirected (e.g., the resource request by client device 210 to access the resource may be redirected to a third party, the network traffic from the resource to client device 210 may be redirected to a third party, client device 210 may be provided access to a resource other than the requested resource, etc.). Assume further that client device 210 requests access to the resource. Based on the access indicator, network security device 220 may redirect the network traffic associated with the resource. In this way, a network operator may redirect network traffic associated with a resource, for safety, network operation, or diagnostic reasons.

In some implementations, client device 210 may be provided access to a resource other than the requested resource, based on the access indicator. For example, assume that a network operator hosts a blockage webpage that indicates that access to a particular resource is blocked. Assume further that network security device 220 stores an access indicator associated with the particular resource, indicating that access to the particular resource is to be blocked and that client device 210 is to be redirected to the blockage webpage. Assume that client device 210 requests access to the particular resource. Based on the access indicator, network security device 220 may block client device 210 from accessing the particular resource. Network security device 220 may further redirect client device 210 to the blockage webpage. Client device 210 may access the blockage webpage instead of accessing the particular resource. In this way, the network operator may cause a webpage or another resource to be presented to client device 210, rather than the requested resource.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
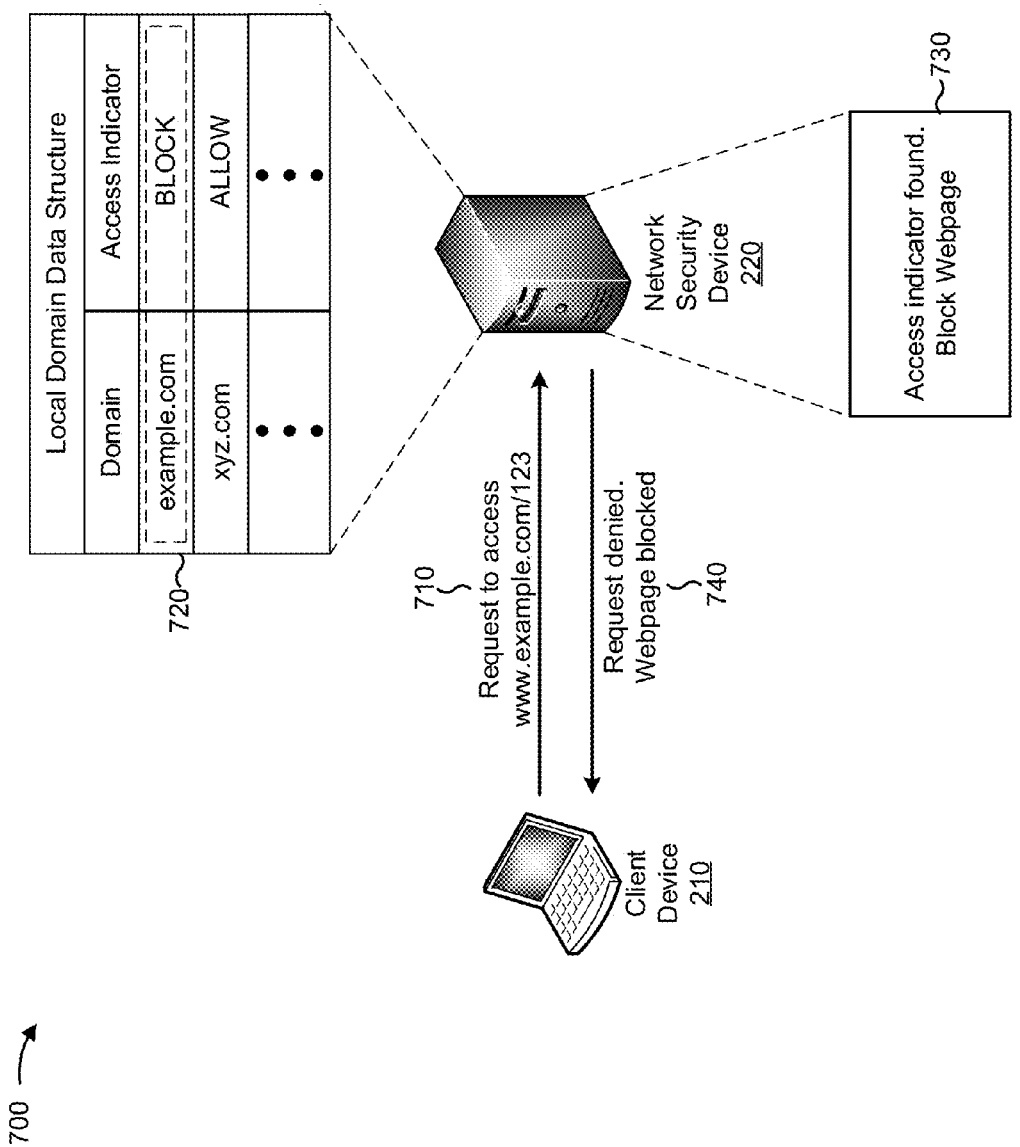
FIG. 7 is a diagram of an example implementation relating to the example process shown in FIG. 6.

FIG. 7 is a diagram of an example implementation 700 relating to example process 600 shown in FIG. 6. FIG. 7 shows an example of controlling access to a resource based on an access indicator. For the purpose of FIG. 7, assume the operations described in connection with FIGS. 5A and 5B have been performed. Client device 210 shown in FIG. 7 need not include client devices 210 that are shown in FIGS. 5A, 5B, and 8.

As shown in FIG. 7, and by reference number 710, client device 210 may transmit, to network security device 220, a request to load a webpage associated with a URL (here, the URL is www.example.com/123). Assume that network security device 220 determines a domain name associated with the URL (here, the domain name is www.example.com). As shown by reference number 720, network security device 220 may search a local domain data structure to determine an access indicator associated with the domain name. As shown, the access indicator associated with the domain name of www.example.com may indicate that network security device 220 is to block access to the resource. In some implementations, network security device 220 may store, in the local domain data structure, the URL path associated with the domain (e.g., the URL path of /123). Network security device 220 may search the local domain data structure for the URL path to determine an access indicator associated with the URL path. As shown by reference number 730, network security device 220 may determine the access indicator by searching the local domain data structure. As shown by reference number 740, network security device 220 may block access, by client device 210, to the webpage. As shown, network security device 220 may transmit, to client device 210, a message indicating that the webpage is blocked. In this way, network security device 220 may control access by client device 210 to the webpage based on the URL associated with the webpage. Network security device 220 may perform these actions more quickly and decrease network traffic by storing the access indicator in a local domain data structure.

As indicated above, FIG. 7 is provided merely as an example. Other examples are possible and may differ from what was described with regard to FIG. 7.

Figure 8:
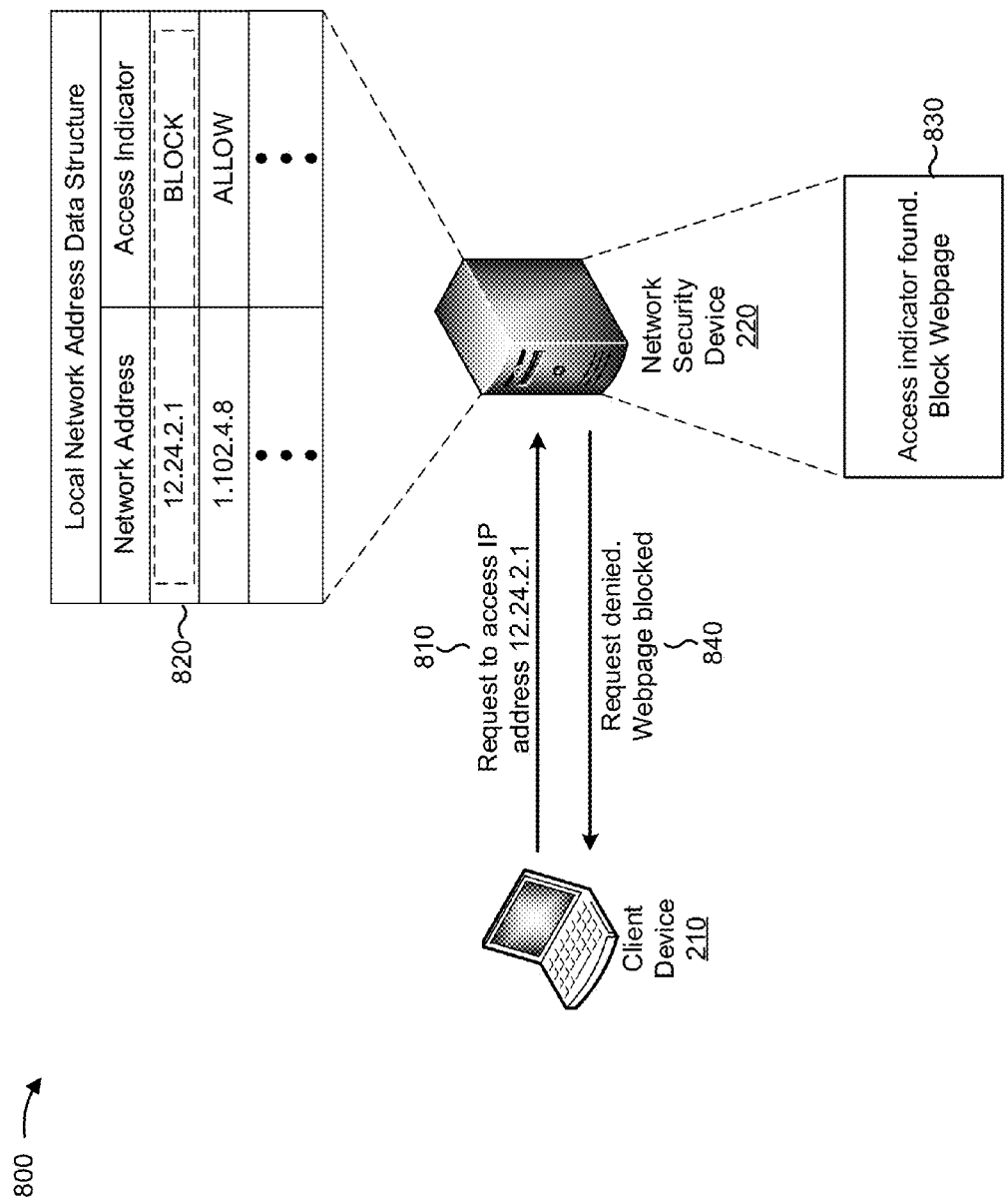
FIG. 8 is a diagram of an example implementation relating to the example process shown in FIG. 6.

FIG. 8 is a diagram of an example implementation 800 relating to example process 600 shown in FIG. 6. FIG. 8 shows an example of controlling access to a resource based on an access indicator. For the purpose of FIG. 8, assume the operations described in connection with FIGS. 5A and 5B have been performed. Client device 210 shown in FIG. 8 need not include client devices 210 that are shown in FIGS. 5A, 5B, and 7.

As shown in FIG. 8, and by reference number 810, client device 210 may transmit, to network security device 220, a resource request including an IP address of 12.24.2.1. As shown by reference number 820, network security device 220 may search a local network address data structure to determine an access indicator associated with the IP address. As shown, the access indicator associated with the IP address may indicate that network security device 220 is to block access by client device 210 to the webpage. As shown by reference number 830, network security device 220 may determine the access indicator associated with the IP address of 12.24.2.1, based on searching the local network address data structure. As shown by reference number 840, network security device 220 may block access, by client device 210, to the webpage, based on the access indicator. As shown, network security device 220 may transmit, to client device 210, a message indicating that the webpage is blocked. In this way, network security device 220 may block access by client device 210 to the webpage based on the IP address associated with the webpage. Network security device 220 may perform these actions more efficiently and decrease network traffic by storing the access indicator in a local network address data structure.

As indicated above, FIG. 8 is provided merely as an example. Other examples are possible and may differ from what was described with regard to FIG. 8.

In this way, a network operator may use customizable access rules to control a client's access to a resource via a variety of resource information types. In some implementations, the network operator may redirect, block, or allow the client's access to the resource. The network operator may store an access indicator locally on a network security device. The network operator may continue to store access indicators locally on the network security device, and may thus continually improve the network security device's data structure. In this way, the network operator may decrease network traffic by reducing a quantity of messages within the network, and may improve network efficiency and response time, by storing the access indicator locally on the network security device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device and from a client device via a network, a first request to access a resource,
the resource being associated with resource information;
determine, by the device, the resource information associated with the first request,
the resource information including at least one of:
a domain name,
a URL path, or
a network address;
determine, by the device, that the at least one of the domain name, the URL path, or the network address associated with the first request is not stored in a local data structure;
requesting, by the device and from a rating server, rating information, based on receiving the first request;
receiving, by the device and from the rating server, the rating information, based on requesting the rating information,
the rating information identifying a rating associated with the resource and further including at least one of:
a category identifier,
a file type identifier, or
a content type identifier;
receiving, by the device, an access rule,
the access rule identifying an access indicator to generate based on the rating information, and
the access rule being based on the resource information;
determining, by the device, whether the rating satisfies a threshold;
generating, by the device, based on the access rule, and based on whether the rating satisfies the threshold, the access indicator,
the access indicator indicating an action to perform related to the resource;
storing, by the device in the local data structure stored on the device, information that indicates an association between the access indicator and the resource;
receiving, by the device, another request to access the resource;
searching, by the device, the local data structure for the access indicator associated with the resource;

determining, by the device, the access indicator based on searching the local data structure; and selectively performing, by the device, the action based on determining the access indicator.

2. The method of claim 1, where the resource is a first resource;

where the resource information is first resource information;

where the access indicator is a first access indicator; and where the method further comprises:

receiving a second request to access a second resource,
the second resource being different than the first resource, and
the second resource being associated with second resource information;

determining that a second access indicator associated with the second resource is not stored in the local data structure;

requesting rating information associated with the second resource information;

receiving the rating information associated with the second resource information;

generating the second access indicator based on the rating information associated with the second resource information; and storing, in the local data structure, information that indicates an association between the second access indicator and the second resource information.

3. The method of claim 1, further comprising:

performing the action indicated by the access indicator,
the action including at least one of:
an action to permit access to the resource,
an action to deny access to the resource,
an action to monitor access to the resource, or
an action to redirect access to the resource.

4. The method of claim 1, where the resource information includes a domain name; and where the method further comprises:

requesting, from a domain name server and based on the domain name, a network address,
the network address being associated with the resource;

receiving, from the domain name server, the network address; and storing, in the local data structure, information that indicates an association between the access indicator and the network address.

5. The method of claim 1, where the information associated with the resource includes information identifying at least one of:

a threshold rating,
a resource category,
a resource type,
a source network address,
a destination network address,
a source network port,
a destination network port, or
a protocol type.

6. The method of claim 1, where the local data structure includes a local domain data structure and a local network address data structure; and where searching the local data structure comprises:

searching at least one of the local domain data structure or the local network address data structure for the access indicator associated with the resource.

7. A device, comprising:

one or more processors to:

receive, from a client device via a network, a request to access a resource,
the resource being associated with resource information;

determine, by the device, the resource information associated with the request to access the resource the resource information including at least one of:
a domain name,
a URL path, or
a network address;

determine, by the device, that the at least one of the domain name, the URL path, or the network address associated with the request is not stored in a local data structure;

obtain, from a rating server, rating information based on receiving the request,
the rating information identifying a rating associated with the resource and further including at least one of:
a category identifier,
a file type identifier, or
a content type identifier;

apply an access rule based on the rating information,
the access rule identifying an access indicator to generate based on the rating information,
the access indicator indicating an action to perform related to the resource, and
the access rule being based on the resource information;

determine whether the rating satisfies a threshold;

generate, based on the access rule, and based on whether the rating satisfies the threshold, the access indicator;

store, in the local data structure stored on the device, information that indicates an association between the access indicator and the resource;

receive another request to access the resource;

search the local data structure for the access indicator associated with the resource;

determine the access indicator based on searching the local data structure; and selectively perform the action based on determining the access indicator.

8. The device of claim 7, where the one or more processors are further to:

request, from a domain name server, an internet protocol (IP) address, based on the resource information;

receive the IP address from the domain name server; and store, in the local data structure, information that indicates an association between the IP address and the access indicator.

9. The device of claim 8, where the one or more processors are further to:

receive, from the client device, a resource request,
the resource request being different than the request to access the resource, and
the resource request including the IP address; and determine the access indicator based on the stored information that indicates the association between the IP address and the access indicator.

10. The device of claim 7, where the one or more processors are further to:

determine that the resource information is not stored in the local data structure; where the one or more processors, when obtaining the rating information, are to:

request, from the rating server and based on determining that the resource information is not stored in the local data structure, the rating information; and
receive, from the rating server, the rating information.

11. The device of claim 7, where the request to access the resource is a domain name service request; and
where the one or more processors are further to:
provide, to a domain name server, a domain name associated with the domain name service request;
receive an internet protocol (IP) address from the domain name server based on the request to access the resource,
the IP address being based on the domain name; and
store, in the local data structure, information that indicates an association between the IP address and the access indicator.

12. The device of claim 7, where the request to access the resource is a first request to access the resource; and
where the one or more processors are further to:
receive, after storing the information, a second request to access the resource;
identify the access indicator associated with the resource; and
perform the action, indicated by the access indicator, for the second request.

13. The device of claim 7, where the action indicated by the access indicator includes at least one of:
an action to permit access to the resource,
an action to deny access to the resource,
an action to monitor access to the resource, or
an action to redirect access to the resource.

14. The device of claim 7, where the information associated with the resource includes information identifying at least one of:
a threshold rating,
a resource category,
a resource type,
a source network address,
a destination network address,
a source network port,
a destination network port, or
a protocol type.

15. The device of claim 7, where the local data structure includes a local domain data structure and a local network address data structure; and
where the one or more processors, when searching the local data structure, are to:
search at least one of the local domain data structure or the local network address data structure for the access indicator associated with the resource.

16. A computer-readable medium storing instructions, the instructions comprising:
one or more instructions that, when executed by one or more processors of a device, cause the one or more processors to:
receive, from a client device via a network, a first resource request,
the first resource request being a request to access a resource,
the resource being associated with resource information;
determine, associated with the first resource request, the resource information associated with the resource,
the resource information including at least one of:
a domain name,
a URL path, or
a network address;
determine that the at least one of the domain name, the URL path, or the network address associated with the first resource request is not stored in a local data structure;
request, from a rating server, rating information based on receiving the first resource request;
receive the rating information,
the rating information identifying a rating associated with the resource and further including at least one of:
a category identifier,
a file type identifier, or
a content type identifier;
receive an access rule,
the access rule identifying an access indicator to generate based on the rating information, and
the access rule being based on the resource information;
determine whether the rating satisfies a threshold;
generate, based on the access rule and based on whether the rating satisfies the threshold, the access indicator,
the access indicator indicating an action to perform related to the resource;
store, in the local data structure stored on the device, information that indicates an association between the access indicator and the resource;
receive a second request to access the resource;
search the local data structure for the access indicator associated with the resource;
determine the access indicator based on searching the local data structure; and
selectively perform the action based on determining the access indicator.

17. The computer-readable medium of claim 16, where the action includes at least one of:
an action to permit access to the resource,
an action to deny access to the resource,
an action to monitor access to the resource, or
an action to redirect access to the resource.

18. The computer-readable medium of claim 16, where the resource information includes a domain name; and
where the one or more instructions, that cause the one or more processors to store the information, cause the one or more processors to:
store, in the local data structure, information that indicates an association between the domain name and the access indicator.

19. The computer-readable medium of claim 18, where the one or more instructions, when executed by the one or more processors, further cause the one or more processors to:
request, from a domain name server and based on the domain name, an internet protocol (IP) address,
the IP address being associated with the resource;
receive, from the domain name server, the IP address; and
store, in the local data structure, information that indicates an association between the IP address and the access indicator.

20. The computer-readable medium of claim 16, where the information associated with the resource includes information identifying at least one of:

a threshold rating,
a resource category,
a resource type,
a source network address,
a destination network address,
a source network port,
a destination network port, or
a protocol type.

* * * * *